(12) United States Patent
Reith et al.

(10) Patent No.: US 10,547,642 B2
(45) Date of Patent: Jan. 28, 2020

(54) SECURITY VIA ADAPTIVE THREAT MODELING

(71) Applicant: T-Mobile USA, Inc., Bellevue, WA (US)

(72) Inventors: Gregory Reith, Federal Way, WA (US); Brett Peppe, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 280 days.

(21) Appl. No.: 15/417,548

(22) Filed: Jan. 27, 2017

(65) Prior Publication Data

US 2018/0219914 A1 Aug. 2, 2018

(51) Int. Cl.
*H04L 29/06* (2006.01)
*G06N 7/00* (2006.01)

(52) U.S. Cl.
CPC .......... *H04L 63/20* (2013.01); *H04L 63/104* (2013.01); *H04L 63/1425* (2013.01); *G06N 7/005* (2013.01)

(58) Field of Classification Search
CPC ..... G06F 21/577; G06F 21/56; H04L 63/1433
See application file for complete search history.

(56) References Cited

U.S. PATENT DOCUMENTS

| | | | |
|---|---|---|---|
| 7,841,008 B1 * | 11/2010 | Cole | G06F 21/577 709/226 |
| 9,516,053 B1 | 12/2016 | Muddu et al. | |
| 2005/0204162 A1 * | 9/2005 | Rayes | H04L 61/2015 726/5 |
| 2013/0159413 A1 | 6/2013 | Davis et al. | |
| 2013/0198846 A1 * | 8/2013 | Chapman | G06Q 10/0635 726/25 |
| 2015/0095969 A1 | 4/2015 | Jain | |
| 2015/0163246 A1 | 6/2015 | Laadan | |
| 2016/0112451 A1 | 4/2016 | Jevans | |

OTHER PUBLICATIONS

International Search Report and Written Opinion for PCT Application No. PCT/US2018/014098 dated May 1, 2018, 15 pages.

* cited by examiner

*Primary Examiner* — Jason K Gee
(74) *Attorney, Agent, or Firm* — Han Santos, PLLC

(57) ABSTRACT

A methods and systems of providing security based on an identified susceptibility profile of a user are provided. Behavioral data related to an account of a user is received for a predetermined period. The behavioral data is analyzed for a pattern of on-line behavior of the user. A susceptibility profile of the user is created based on the pattern of on-line behavior. Environment parameters are received from a database. A security threat model is created based on the susceptibility profile and the environment parameters. A report data packet based on the created threat model is sent to an account of the user.

20 Claims, 4 Drawing Sheets

SECURITY VIA ADAPTIVE THREAT MODELING

BACKGROUND

In recent years, as an increasing number of communication applications have migrated to packet transport that was often intended for an open Internet application, such applications have become subject to many of the security issues that plague the public Internet. Malicious software (malware) and social engineering tactics are becoming of increasing concern.

Malware is software designed to disrupt the operation of a computing device, including personal computers (PCs) and mobile devices such as smart-phones, tablets, and personal digital assistants (PDAs). Malware includes viruses, worms, spyware, Trojans, adware, botnets, spambots, keyloggers, etc. For example, a Trojan is a malicious program hidden within a legitimate application. When activated, a Trojan allows criminals to gain unauthorized access to a user's computer (e.g., mobile device). A botnet is a collection of malware affected devices, ranging in size from a dozen to tens of thousands that can be coordinated by a Command and Control (C&C) server. A botnet can be used in spam, identity theft, or distributed denial of service (DDOS) attacks. A spambot is an automated program that harvests personal contact information to send unsolicited email, short message service (SMS) or social media messages. A spambot may even decipher passwords and send its messages directly from a user's account. A keylogger captures passwords, usernames, bank account information, and credit card numbers typed into a computing device to later transmit the information back to the nefarious party.

Users may also become prey to social engineering for a variety of reasons, which in the context of computing device security, is the manipulation of users into performing actions or divulging confidential information. It is also used in deception for the purpose of information gathering, fraud, or unauthorized computing device access. For example, a hacker may contact a system administrator and pretend to be a user who cannot get access to his or her system. For simplicity, any form of malware or social engineering event or combination of events are collectively referred to herein as a "security attack."

In order to guard against these advanced threats and others in a complex and evolving climate of virtualization, cloud services, and mobility, individual users as well as business enterprises increasingly take a data-centric approach to safeguarding their sensitive information. Software-based security solutions are frequently used to encrypt the data to protect it from theft. Encryption encodes messages or information in such a way that only authorized parties can have access to it. Other security efforts include better passwords, ever more complicated encryption techniques, and hardening of machines and communication channels. Such security approaches can be weakened by the carelessness or lax attitude of users of these protected systems. Different types of users may be more vulnerable to different types of security attacks.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Overview

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

This disclosure is directed to adaptive threat modeling, and more particularly, to methods and systems of providing security based on an identified susceptibility profile of a user. Applicants understand that personality characteristics may exert influence regarding choices about online behavior. Such personality characteristics may even override awareness of online threats, sometimes referred to herein as a security attack. Distraction and/or inattentiveness of users (i.e., a person using a network vi a computing device) add risk. An equally important factor is trait based or physiologically produced susceptibility to social engineering. In this regard, applicants have identified that security should be based on a user's susceptibility profile to a security attack. Instead of applying a "one size fits all" strategy towards security that is focused on technical or gross behavior, a network or business enterprise may tailor a level of security based on the susceptibility profile of a user.

To that end, trait based and physiologically focused data that can be in cases gleaned from existing behavioral data in combination with added HUMINT type data sets related to an account of a user is received for a predetermined period. The behavioral data is analyzed for a pattern of on-line behavior of the user. A susceptibility profile of the user is created based on trait and physiologically based characteristics and the pattern of on-line behavior. Environment parameters are received from a database. A security threat model is created based on the susceptibility profile and the environment parameters. A report data packet based on the created threat model is sent to an account of the user.

By virtue of creating a threat model that is based on each user individually, an increasingly aggressive security stance can be implemented the more vulnerable a user is identified to be. In this way, security measures that are adaptive to a user's susceptibility profile may be implemented. The techniques described herein may be implemented in a number of ways. Example implementations are provided below with reference to the following figures.

Example Architecture

Figure 1:
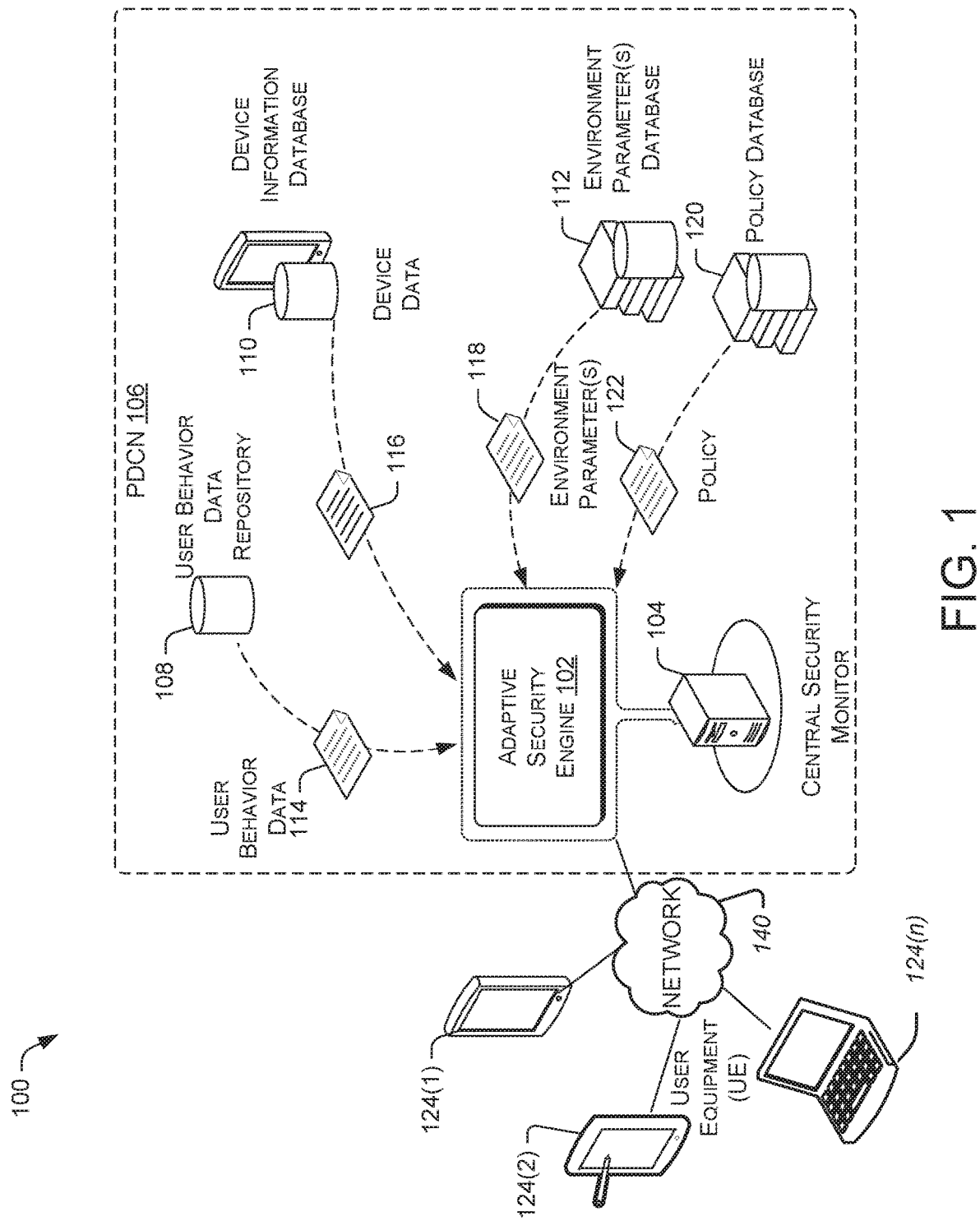
FIG. 1 illustrates an example architecture for implementing an adaptive threat modeling security system for a subscribed user.

FIG. 1 illustrates an example architecture 100 for implementing an adaptive threat modeling security system for a subscribed user. Architecture 100 includes a network 140 that may allow various user equipment (UE) 124(1) to 124(n) to communicate with each other as well as any other components that are connected to the network 140. The network 140 may be, without limitation, a local area network ("LAN"), a virtual private network ("VPN"), a cellular network, the Internet, or any combination thereof. To facilitate the present discussion, network 140 will be described, by way of example only and not by way of limitation, as a mobile network as may be operated by a carrier or service provider to provide a wide range of mobile communication services and ancillary services or features to its subscriber customers and associated mobile device users. Network 140 allows users of the user equipment (e.g., customers or subscribers to the network 140), to send information to and receive information from a packet data communication network (PDCN) 106 that provides ancillary support to the network 140, discussed in more detail below.

The PDCN 106 includes an adaptive security engine 102 that may execute on one or more computing device 104. The computing device 104 may include general purpose computers, such as desktop computers, tablet computers, laptop computers, servers, and so forth. However, in other embodiments, the computing device 104 may include smart phones, game consoles, or other electronic devices that are capable of receiving inputs, processing the inputs, and generating output data. In various embodiments, the computing device 104 may be controlled by a mobile telecommunication carrier that provides the wireless telecommunication network 106, or controlled by a third-party entity that is working with the mobile telecommunication carrier. While a single computing device 104 is illustrated, it will be understood that the functions of the computing device 104 may be implemented in a distributed fashion on a number of similar platforms, to distribute the processing load. In some embodiments, the computing device 104 may comprise virtual computing devices in the form of virtual machines or software containers that are hosted in a cloud.

The adaptive security engine 102 may access data that is stored on a user behavioral data repository 108, a device information database 110, and an environment parameter database 112 of the PDCN 106. The adaptive security engine 102 may also communicate directly with a user equipment (e.g., 124(1)) to receive recent behavioral data therefrom. Accordingly, in various embodiments, the adaptive security engine 102 of the central security monitor 104 may obtain user behavioral data from the user behavioral data repository 108 and/or directly from the user equipment.

The user behavioral data repository 108 is configured to store user behavior that has been received from various user equipment 124(1) to 124(n) at predetermined intervals (e.g., daily, weekly, etc.) or upon a trigger event (e.g., when a threshold condition is met). In various embodiments, the user behavioral data repository 108 may store the behavioral data in a table for each user equipment individually or in logical groups. The user behavioral data repository 108 may include one or more databases, such as relational databases, object databases, object-relational databases, and/or key-value databases. A logical group may include a department (e.g., accounting, engineering, etc.), a geographic region (e.g., floor in a building, zip code, etc.), or based on user title (e.g., manager, contractor, etc.,). In various embodiments, the trigger event for the behavioral data repository 108 to receive the behavioral data may be initially identified by the adaptive security engine 102, the user behavioral data repository 108, and/or the user equipment (e.g., 124(1) to 124(n)).

The user behavioral data repository 108 may provide the stored user behavioral data 114 for one a user equipment at predetermined intervals or upon a trigger event (i.e., the adaptive security engine 102 of the central security monitor 104 requesting such information in the form of a data packet 114). In some embodiments, where several users are part of a predetermined group, the behavioral data repository 108 provides behavioral data of the users of the predetermined group, such that the group behavior is analyzed by the adaptive security engine 102. For simplicity, the operation of the architecture 100 is discussed herein by way of example with respect to a user, while it will be understood that a group of users may be used within the scope of the present disclosure.

The device information database 110 may provide the adaptive security engine 102 with previously stored device data 116 in the form of a data packet. The device data 116 may indicate the platform, configuration, technical capabilities, security capabilities, feature settings, and operational statuses of various user equipment, collectively referred to herein as the type of user equipment. For example, device data for a particular user equipment may indicate the latest firmware, the amount of memory, the processor speed, what sensors it includes, the security features that it includes (and/or that may be activated), and so forth. For example, a user equipment in the form of a personal computer (PC) may be subject to more security threats than a user equipment in the form of a smart watch. Similarly, a PC may have more security tools that could be activated and/or adjusted than a smart watch. By way of identifying the configuration of a user equipment, the adaptive security engine 102 can provide a more accurate security solution for each user equipment, respectively, based on the threat model. The notion of a security solution that is based on a security threat model and device data 116 is discussed in more detail later.

The architecture 100 may include an environment parameter database 112 (i.e., a library) configured to store and maintain an up-to-date list of present network security concerns. For example, the environment parameter database 112 may be maintained by a security software company or a consortium of organizations and/or individuals interested in network security. Accordingly, the environment parameter database 112 may provide the adaptive security engine 102 environment parameters 118 in the form of a data packet at predetermined intervals or upon a trigger event. The environment parameters 118 may be based on region, network, group, and/or overall threat level climate. For example, if a large number of security attacks are identified by the environment parameter database for a particular region, the security concern in the environment parameters 118 may be at a higher end of an appropriate scale or combination of scales. In another example, if a predetermined security event is anticipated (e.g., a visit of a dignitary, a date with symbolism (e.g., 9/11)), then the security concern may also be elevated. In some embodiments, the environment parameters 118 may comprise one or more scores for different security parameters, such as (without limitation), type of security attack, severity of the security attack, probability of a security attack, number of security attacks experienced in a predetermined period or anticipated in a future period, etc. Each score may be alpha-numeric (e.g., 0 to 10, A to F), descriptive (e.g., none, low, medium, and high), based on color (e.g., red, green, and yellow), or any other suitable rating scale or combination thereof.

In one embodiment, the architecture 100 includes a policy database 120 configured to store rules, thresholds, and/or remediation policies and versions thereof. The appropriate policy 122 is provided to the adaptive security engine 102 based on the identified threat model (and device data).

In various embodiments, a trigger event for the adaptive security engine 102 to receive the environment parameters 118 may include the adaptive security engine 102 specifically requesting the environment parameters 118 via a pull operation (e.g., to determine a security threat model for a user and/or a security solution for a user equipment), and/or the environment parameter database 112 pushing the environment parameters 118 to the adaptive security engine 102 upon one or more security parameters exceeding predetermined thresholds.

As mentioned previously, the adaptive security engine 102 may also directly (i.e., electronically) interact with user equipment (e.g., 124(1)) to obtain user behavioral information therefrom. For example, the adaptive security engine 102 may interact with an adaptive security application stored in a memory of a user equipment (e.g., 124(1)) to determine sensor status information and other security information therefrom. The sensor status information and the adaptive security engine 102 are discussed in more detail below.

The adaptive security engine 102 uses the received user behavioral data 114, the device data, and the environment parameters 118 to provide network security to the system depicted in the architecture 100. By providing a tailored threat model for each individual user, the network security of the users that are subscribed to the network 140 (and/or a business enterprise) is improved. Furthermore, by providing a tailored security solution based on the threat model for the user and for each type of user equipment used by the user, an advanced security environment is provided that is optimized not only to a user but also to the user equipment used thereby.

For example, the user behavioral data 114 may be used to create a susceptibility profile of a user. In one embodiment, the susceptibility profile of the user may be different for different environments. An environment may include a type of user equipment used by the user, a location of the user, a time of day, ambient conditions (e.g., volume, temperature, etc.,). The susceptibility profile that is calculated via the user behavioral data together with the environment parameters 118 may be used by the adaptive security engine 102 to develop a security threat model for a user. A security threat model defines the susceptibility of a user to a security attack in view of the environment parameters. In one embodiment, a suitable scale may be used to characterize a security threat model of a user.

In one embodiment, the adaptive security engine 102 uses the device data 116 of the one or more user equipment associated with a user, together with the threat model, to determine a security solution for the one or more user equipment associated with a user. In various embodiments, the type of user equipment (e.g., platform, configuration, etc.) may be provided by the user behavioral data repository 108 and/or the device information database 110, where the type and configuration of the user equipment that is used to access a network 140 or a private network is recorded. In various embodiments, each user equipment may be previously registered for network 140 access. Alternatively, or in addition, each time behavioral data is received by the data repository 108, it includes identification information of the user equipment.

The identification information may include the International Mobile Station Equipment Identity (IMEI), Mobile Station International Subscriber Directory Number (MSISDN), Mobile Equipment IDentifier (MEID), or the like. By virtue of the device data 116, the adaptive security engine 102 can determine the type of the UE being used by the user as well as the physical (e.g., hardware/software) security vulnerabilities and strengths of the user equipment. Based on the device data and the threat model, an appropriate security solution may be provided in the form of a report data packet that is sent to the appropriate user equipment.

The adaptive security engine 102 may iteratively create and maintain a security threat model and/or security solution for a user and the corresponding user equipment. In some embodiments, the threat model may be different for different types of user equipment and for different environments. For example, the adaptive security engine may apply a lower security threshold for corrective action for a user operating a smart watch, where the user may not be as careful with security issues, than when using a desktop computer, where the user is more likely adhere to better security habits.

To accommodate communication with the workflow engine 102 and/or user behavioral data repository, each user equipment (124(1) to 124(n)) may include an adaptive security application that is stored in its memory. The adaptive security application is operative to provide interactive and automatic support to the adaptive security engine 102 of the central security monitor by providing user behavioral data 114 based on the corresponding user equipment (e.g., 124(1)). In various embodiments, the adaptive security application provides such behavioral data in the form of electronic data to the adaptive security engine 102 (and/or the user behavioral data repository 108) upon request or periodically, over the network 140 as part of a behavioral data upload. In some embodiments, the behavioral data is harvested and provided by the adaptive security application of a user equipment every time the user logs in to use the network 140. In this way, the adaptive security engine 102 may iteratively monitor and adjust the threat model for a particular subscribed user and potentially provide a security solution based on the various types of user equipment used. Systemic problems with security can be identified with respect to the use of a type of user equipment in particular or a user in general.

In some embodiments, the adaptive security engine 102 may collect and analyze statistics based on the user behavioral data and the environment parameters 118 to determine emerging systemic problem trends in security. In this way, the adaptive security engine 102 may send notifications to system administrators of the network 108 and/or a business enterprise using the network 140 to potentially preempt security problems and adaptively apply the most effective solutions to security concerns.

While the user behavioral data repository 108, the device information database 110, and the environment parameter database 112, have been illustrated by way of example to be separate from the central security monitor 104, the functionality described herein with each one of these components can be combined in various combinations. In other words, the user behavioral data repository 108, the device information database 110, the environment parameter database 112, and the central security monitor 104 need not be a stand-alone computing devices but can be combined in various configurations.

Example Computing Device Components

Figure 2:
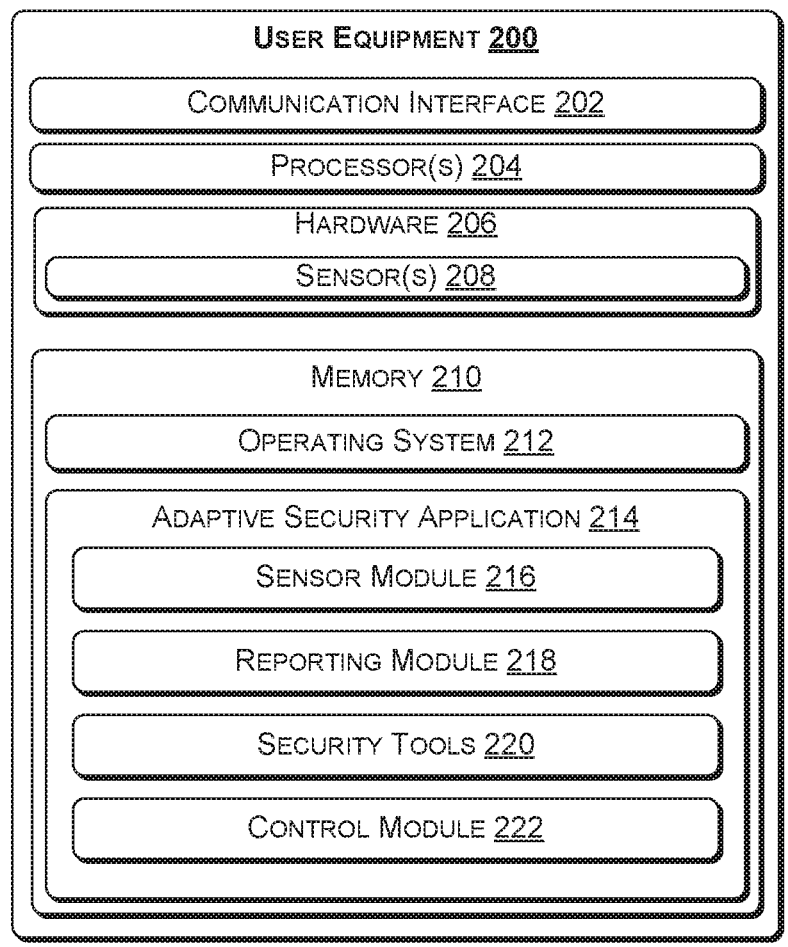
FIG. 2 is a block diagram showing various components of an example user equipment that may be used as part of the architecture of FIG. 1.

FIG. 2 is a block diagram showing various components of an example user equipment 200 that may be used as part of the system of FIG. 1. User equipment 200 may be able to communicate with other user equipment as well as components that are connected to the network 140 of FIG. 1. The user equipment 200 may include a communication interface 202, one or more processors 204, memory 210, and hardware 206. The communication interface 202 may include wireless and/or wired communication components that enable the user equipment to transmit data to and receive data from other networked devices.

The hardware 206 may include sensors 208, one or more additional hardware interfaces, a data communication block, and/or data storage hardware. For example, the hardware interfaces may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices. Sensors may include an accelerometer, a gyroscope, a global positioning system (GPS), a temperature sensor, a moisture sensor, image/light sensor, a biometric sensor, and the like. It should be noted that in some embodiments, sensors include applications such as windows management instrumentation (WMI) and other auditing application program interface (API), which may be used to monitor the behavior of a user. For simplicity, data input devices, hardware sensors, and sensor applications are collectively referred to herein as user behavior sensors.

Each sensor, or combination of sensors, may be used to capture behavioral data that may later be used to identify a security susceptibility profile for a user. The GPS sensor may be used to determine a location and date/time where a user uses the user equipment 200 for communication over the network 140. For example, the information provided by the GPS sensor may be used to identify whether a user is stationary at work, moving (e.g., a passenger in a vehicle), at home, at a bar, or at an arbitrary location. Communication that is conducted at work may later be deemed by the adaptive security engine 102 of the central security monitor 104 to be more secure than that conducted in a moving vehicle or at a bar (e.g., where other individuals may be able to monitor the communication and/or the user may be operating the user equipment in a careless way). Further, communication that is conducted during regular business hours may be deemed more secure than that conducted at unusual hours (e.g., 2 am to 6 am) because the user may be more tired and, hence, more susceptible to a security attack.

Similarly, an accelerometer may indicate that the user is physically active, e.g., walking, running, etc., which may correspond to a psychological profile of a user (e.g., the user may be more susceptible to a security attack). Various ambient conditions may also help develop a susceptibility profile of a user. For example, a light sensor may indicate the length of time that a user operates a user equipment 200 under non-optimal ambient lighting conditions (e.g., too dark or too bright) which may lead to careless mistakes. A microphone may be used to determine whether the user is operating the user equipment 200 in a noisy environment, which may lead to distractions. In some instances, the sound that is creating the noisy environment may be generated by the user equipment 200 itself. For example, the user equipment may be a tablet that is playing music in the background. In this regard, a sensor module (discussed below) may record such occurrence as part of the behavioral data of the user associated with the user equipment 200.

Various online habits may be monitored by the user device 200 to generate user behavioral data. A sensor (or combination of sensors) may be used to identify details about the type and volume of information in a predetermined time period that is shared on social networking sites, such as Facebook, Twitter, Instagram, and the like. The more information is shared with such sites, the higher the susceptibility profile (i.e., more prone to risk) the user may be deemed.

Behavioral data may include how frequently the user: clicks on an advertisement link during a predetermined time period; provides their personal information (e.g., address, telephone number, etc.) online; opens e-mail attachments from sources that are not in the address book; number of misspellings identified in an out-going e-mail; etc. Behavioral data may also include how frequently a user indicates in the content of an e-mail that there is an attachment (e.g., "attached please find") but fails to include an attachment. In some embodiments, the sites that were visited by the user on the user equipment 200 may be included in the behavioral data. Accordingly, a type and source of the content solicited by the user may be identified. In this way, the adaptive security engine 102 of the central security monitor 104 can later determine whether and/or how often a user visits sites that are deemed to be a security risk.

It should be noted that the actual susceptibility profile is not provided by the user equipment. Rather, the user equipment provides raw behavioral data to the user behavioral data repository 108 of FIG. 1, which is later used by the adaptive security engine 102 of the central security monitor 104 to develop a susceptibility profile based on the received user behavioral data.

The user equipment 200 includes a memory 210 that may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism.

The processors 204 and the memory 210 of the user equipment 200 may implement an operating system 212 and the adaptive security application 214. The operating system 212 may include components that enable the user equipment 200 to receive and transmit data via various interfaces (e.g., user controls, communication interface, and/or memory input/output devices), as well as process data using the processors 204 to generate output. The operating system 212 may include a presentation component that presents the output (e.g., display the data on an electronic display, store the data in memory, transmit the data to another electronic device, etc.,). Additionally, the operating system 212 may include other components that perform various additional functions generally associated with an operating system.

The adaptive security application 214 may include a sensor module 216, a reporting module 218, one or more security tools 220, and a control module 222. The modules may include routines, program instructions, objects, and/or data structures that perform particular tasks or implement particular abstract data types.

The sensor module 216 is configured to receive information from various sensors 208 to create behavioral data therefrom. For example, the sensor module 216 may interact with one or more sensors 208 to harvest raw data related to the online behavior of a user, at predetermined intervals or at a trigger event (e.g., a number of occurrences of a monitored event exceeds a predetermined threshold).

The reporting module 218 is configured to provide the behavioral data harvested from the various sensors 208 by the sensor module 216 to the user behavioral data repository 108 over the network 140 at predetermined intervals or upon a trigger event. To that end, the reporting module 216 may create a data packet with predetermined fields, referred to herein as a "report data packet," where each field is operative to indicate a different aspect of the user behavior. In some embodiments, a header of the data packet includes identification information of the user equipment 200.

The security tools module 220 may include one or more software tools to provide security to the user, the network 140, and/or a business enterprise associated with the data traffic of the user equipment 200. The security tools may include, without limitation, an intrusion detection and prevention system, anti-malware, mobile device management, firewall, network access control, authentication and authorization, etc. These tools may be activated and/or adjusted based on instructions from the control module 222, as discussed in more detail below.

The control module 222 is configured to receive information in the form of a report data packet from the adaptive security engine 102 of the central security monitor 104. The report data packet may include elements of a threat model for the user operating the user equipment 200. In some embodiments, the report data packet may include a security solution that is tailored for the particular user equipment 200. In some embodiments, the report data packet may include a different security solution for each known user equipment associated with an account of the user. Thus, the user equipment 200 may receive a report data packet comprising a plurality of security solutions.

Upon receiving the data packet from the adaptive security engine 102, the control module 222 activates and/or configures one or more security tools 220. Accordingly, by virtue of interacting with the adaptive security engine 102, the user is protected based on a particular threat model identified by the adaptive security engine 102 that is in harmony with the susceptibility profile of the user and the present environment parameters. Further, in some embodiments, a security solution is implemented for the user equipment that is tailored for the type of the particular user equipment 200.

Figure 3:
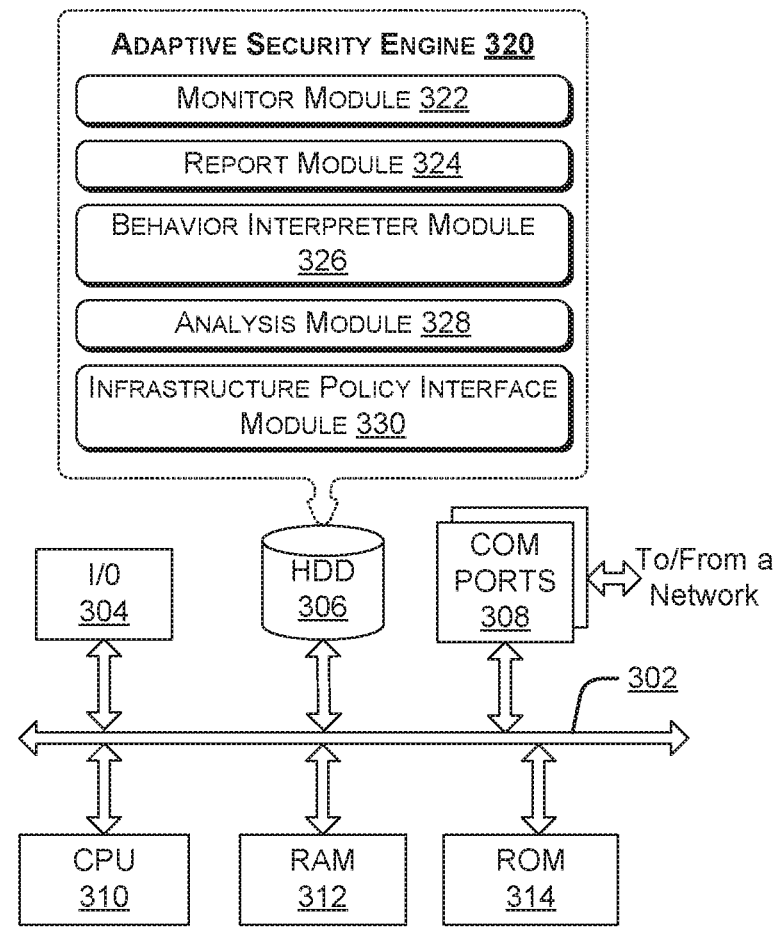
FIG. 3 provides a functional block diagram illustration of a computer hardware platform that may be used to implement a central security monitor of FIG. 1.

Example Central Security Monitor:

As discussed above, functions relating to providing an adaptive threat security model for a user and a security solution for a corresponding user equipment can be performed on one or more computing devices connected for data communication, as shown in FIG. 1. An exemplary computing device in the form of a user equipment 200 has been discussed above with respect to FIG. 2. FIG. 3 provides a functional block diagram illustration of a computer hardware platform that may be used to implement the central security monitor 104 of FIG. 1. By way of example and not limitation, FIG. 3 illustrates a network or host computer platform 300, as may be used to implement a server.

The central security monitor 300 may include a data communication interface 308 having one or more communication ports for packet data communication. The central security monitor 300 may include an I/O interface 304 that may include a display, a touch screen, a keyboard, a pointing device, a microphone, a loudspeaker, and/or any other type of user interface device. The central security monitor 300 also includes a central processing unit (CPU) 310, in the form of one or more processors, for executing program instructions. The central security monitor 300 may include an internal communication bus 302, a memory 306 for program and data storage for various data files to be processed and/or communicated by the central security monitor 300, although the computing device may receive programming and data via network communications. Data can be stored in various forms of computer-readable media, including (but not limited to) hard disk drive (HDD) 306, random access memory (RAM) 312, read only memory (ROM) 314, and the like. The central security monitor 300 has an adaptive security engine 320 stored in its memory, represented by way of example only and not by way of limitation, as HDD 306. The adaptive security engine 320 may have various modules configured to perform different functions.

For example, adaptive security engine 320 may include a monitor module 320 operative to receive user behavioral data 114, device data, 116 and environment parameters 118 from the user behavioral data repository 108, device information database 110, and the environment parameter database 112, respectively. In one embodiment, the monitor module 320 may receive behavioral data directly from a subscribed user equipment (e.g., 124(1) to 124(n). The monitor module 320 may receive this information in the form of data packets at predetermined intervals or upon a trigger event. In some embodiments, not all data is necessary for the adaptive security engine 320 to develop a security threat model. For example, the user behavioral data 114 provided by the user behavioral data repository 108 may be enough. This data may later be supplemented with the environment parameters 118 from the environment parameter database 112 and/or the device data from the device information database 110.

The report module 324 is operative to report the threat model and/or the security solution for a particular user equipment platform to one or more recipients in the form of a data packet. This report data packet may be sent to an account of the subscribed user, to a system administrator of the business enterprise associated with the user (e.g., information technology (IT) department). In various embodiments, report data packet may be sent via common short code (CSC) using a short message service (SMS), multimedia message service (MMS), e-mail, telephone, social media, etc.

The report data packet may be operative to inform the user and/or the system administrator of the identified threat model of the user by providing a corresponding warning. In some embodiments, the report data packet includes a security solution for a particular user equipment that is operative to invoke and/or adjust one or more security tools on the respective user equipment. In one embodiment, if different types of user equipment are identified to correspond to an account of the user, then the data packet may have a different solution for each type of user equipment.

In some embodiments, the report data packet is operative to adjust the network security protocols for the business enterprise associated with the user. For example, the report data packet may be received by a server (e.g., computing device) of a business enterprise that is configured to control the security parameters of the business enterprise. Consequently, additional security precautionary measures may be implemented at the server end for users that have threat model that is above a predefined threshold (i.e., identified to have a higher security risk).

In some embodiments, upon determining that a threshold number of subscribed users in a group that are associated with a business enterprise have a security threat model that is above a predetermined threshold, the report data packet is sent to other users that are in a same logical group, as characterized previously. Put differently, a user having a low threat model may still receive a report data packet if a threshold number of users in its group have been deemed to pose a security threat to the business enterprise, as a prophylactic measure. In another embodiment, if the threat model is above a predetermined threshold (i.e., is severe enough), the report data packet is sent to the accounts of all users in the same group as the user.

The behavior interpreter module 326 provides various functionality to identify a risk associated with a user. In one aspect, the behavior interpreter module 326 uses the received user behavioral data 114 for a predetermined period to determine a susceptibility profile for a user. The development of a susceptibility profile of a user may be an iterative process whereby the raw security sensor data that is stored in the user behavioral data repository for a predetermined time period is continuously evaluated to progressively refine the psychological vulnerability profile of a user, sometimes referred to herein as the susceptibility profile. For example, the stored raw user behavioral data 114 is received from the user behavior data repository 108 for a predetermined time period in the form of a data packet that is evaluated for behavior patterns. As the evaluated time window moves forward with time, a continuously more accurate susceptibility profile of the user may be developed.

In one embodiment, machine learning may be used to construct algorithms that can learn from and make predictions based on the user behavioral data 114 received from the user behavioral data repository 108. Such algorithms operate by building a model from stored prior user behavioral data or baselines therefrom in order to make data-driven predictions or decisions (OR to provide threshold conditions to indicate a security risk), rather than following strictly static criteria. Based on the machine learning, patterns and trends of the user behavior are identified to develop a susceptibility profile for the user.

In various embodiments, the machine learning discussed herein may be supervised or unsupervised. In supervised learning, the central security monitor 104 may be presented with example data from the data store as being acceptable. Put differently, the user behavioral data repository 108 acts as a teacher for the behavior interpreter module 326. In unsupervised learning, the user behavioral data repository does not provide any labels as what is acceptable; rather, it simply provides historic data to the behavior interpreter module 326 that can be used to find its own structure among the user behavioral data 114.

In various embodiments, the machine learning may make use of techniques such as supervised learning, unsupervised learning, semi-supervised learning, naïve Bayes, Bayesian networks, decision trees, neural networks, fuzzy logic models, and/or probabilistic classification models. The riskier the behavior of a user, as identified to be by the behavior interpreter module 326, the higher the susceptibility profile rating for the user.

The adaptive security engine 320 may include an analysis module 328 that is operative to develop a security threat model based on the identified susceptibility profile and the environment parameters 118. The environment parameters 118 received from the environment parameter database 112 may be based on region, network, group, and/or overall threat level climate, as defined by the environment parameter database 112. For example, if a large number of security attacks are identified by the environment parameter database, the security concern indicated in the environment parameters may be elevated. Put differently, the environment parameters may act as a scaling factor that may escalate the susceptibility profile to a higher threat model if the environment parameters indicate that the user is using the network 140 in a vulnerable network environment.

The adaptive security engine 320 may also include an infrastructure policy interface module 330 that is operative to analyze the threat model developed by the behavior interpreter module 326, in view of the received device data 116 from the device information database 110, to provide a security solution. In some embodiments, the threat model by itself or together with the device data may be sent to the policy database 120 to retrieve an appropriate policy 122 therefrom. The policy database may periodically adjust the policy for different threat models and/or environment parameters 118. The security solution may then be based on the policy 122, as provided by the policy database.

In some embodiments, the security solution comprises instructions and/or code that is tailored for a particular user equipment, accordingly. For example, the adaptive security engine 320 may retrieve (e.g., from a memory 306, 312, or 314 of the central security monitor 104 or the device information database 110) information regarding one or more user equipment that are identified to correspond to a target user account. For each type of a user equipment, a different security solution may be developed. For example, a security solution for a smart watch may be different from that of a desktop computer. The security solution may include a solution for each type of the known user equipment. Upon receipt of the security solution, the control module 222 of the user equipment can access the appropriate portion of the data security solution that pertains to that particular user equipment to advance the corrective action.

Thus, upon receiving the report data packet from the adaptive security engine 320, the control module 222 configures and/or activates one or more security tools 220. Accordingly, by virtue of receiving the security solution from the adaptive security engine 320, as provided by the infrastructure policy interface module 330, the user is protected based on a particular threat model identified by the adaptive security engine 102 that is in harmony with the susceptibility profile of the user, the present environment parameters, and the type and configuration of the user equipment being used.

In one embodiment, the functions of the central security monitor may be implemented in a distributed fashion on a number of similar platforms, to distribute the processing load. In one embodiment, the functionality of the central security monitor 300 discussed herein may be combined in one or more server platforms. For example, the functions of the user behavioral data repository 108, the device information database 110, and the environment parameter database 112 may be performed on the same server (e.g., central security monitor 300). In one embodiment, the platform 300 may have a scalable and fault-tolerant architecture, such as that provided by the cloud.

The software functionalities discussed herein involve programming, including executable code as well as associated stored data, e.g., files used for applications on the central security monitor 300, such as the adaptive security engine 320, as discussed herein. The software code is executable by the corresponding computing device. In operation, the code is stored within the computing device. At other times, however, the software may be stored at other locations and/or transported for loading into the appropriate computing device system. Execution of such code by a processor of the computing device enables the computing device to perform the adaptive threat modeling as described herein. Hence, aspects of the methods of optimizing the security for each individual user as outlined above may be embodied in programming. Program aspects of the technology may be thought of as "products" or "articles of manufacture" typically in the form of executable code and/or associated data that is carried on or embodied in a type of non-transitory machine readable medium.

Example Processes

Figure 4:
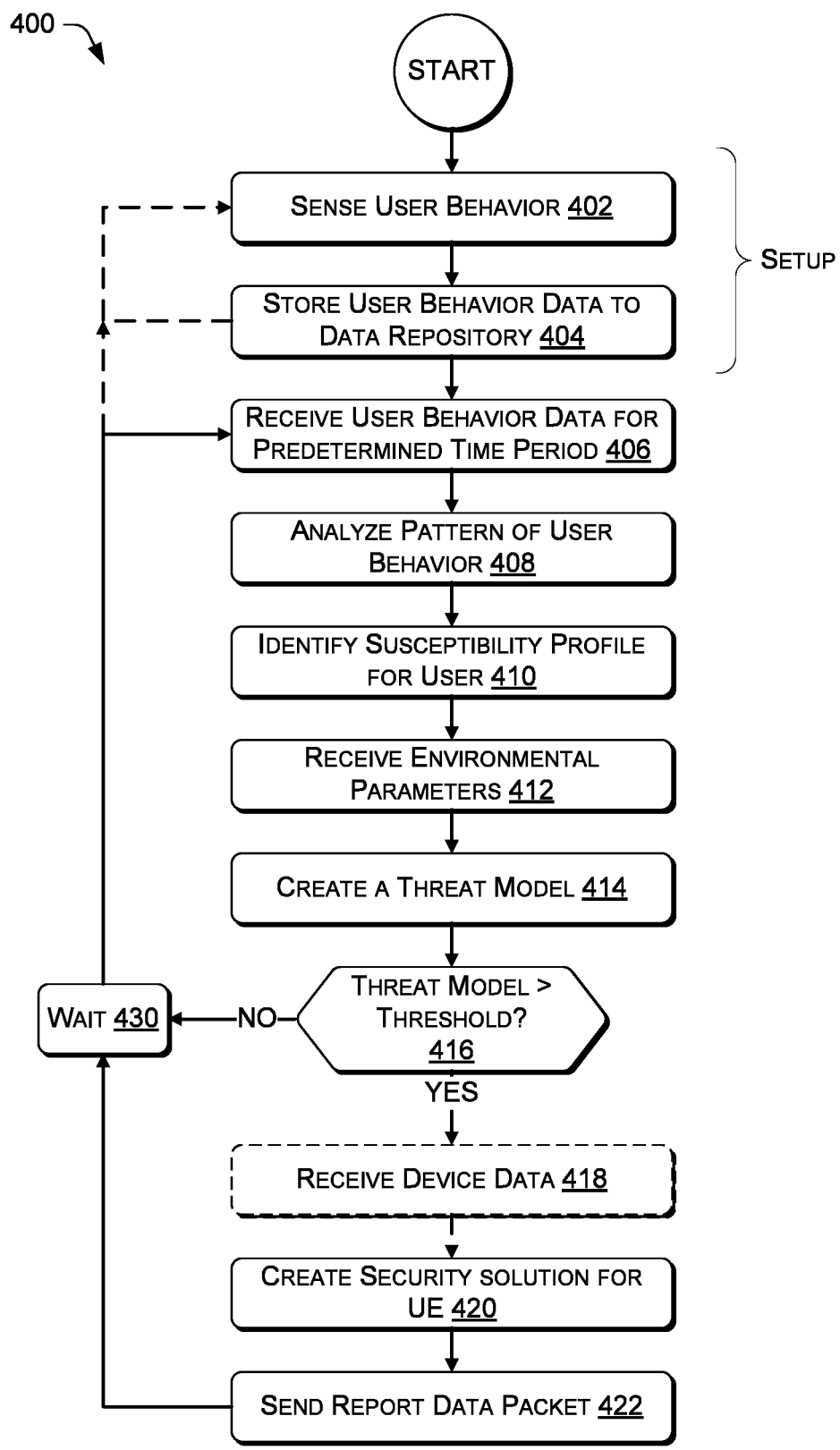
FIG. 4 presents an illustrative process for providing an adaptive threat security for a user.

With the foregoing overview of the architecture 100, the user equipment 200, and the adaptive security engine 320, it may be helpful now to consider a high-level discussion of an example process. To that end, FIG. 4 presents an illustrative process 400 for providing adaptive threat security for a user. Process 400 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or performed in parallel to implement the process. For discussion purposes, the process 400 is described with reference to the architecture 100 of FIG. 1, although aspects of the user equipment 200 of FIG. 2 and the central security monitor 300 of FIG. 3 are invoked as well.

At block 402, user behavior sensors of one or more user equipment sense user behavior. In various embodiments, an adaptive security application stored in a memory of each user equipment coordinate a behavior sensor or a combination of behavior sensors on the corresponding user device to harvest raw behavioral data related to a user's online behavior.

At block 404, a reporting module of the user equipment provides the behavioral data harvested from the various behavioral sensors to a user behavior data repository 108 at predetermined intervals or upon a trigger event. Accordingly, the user behavior data repository 108 may receive data packets from various user equipment corresponding to various subscribed users. Each behavioral data packet may comprise behavioral data observed by the adaptive security application 214 on the user equipment, as operated by a corresponding subscribed user. Each behavioral data packet is for a time interval that covers the period from the last time a behavioral data packet was sent to the user behavior data repository 108 (i.e., referred to herein as a first time period). In some embodiments, blocks 402 and 404, as part of a setup phase, are independent from the remaining blocks. Put differently, the sensing of the user behavior of block 402 and the storage of the user behavioral data in the data repository in block 404 are performed iteratively at a pace that may be different and/or independent from the following blocks, as explained in more detail below.

At block 406, the monitor module 322 of the adaptive security engine 320 that is stored in the memory of the central security monitor 300 receives the user behavioral data 114 for a predetermined time period (i.e., referred to herein as a second time period) for a target subscribed user. In various embodiments, the second time period may be the same as the first time period or may be longer. For example, the first time period may be hourly, whereas the second time period is daily, weekly, monthly, etc. In this way, the adaptive security engine 320 can process behavioral data in aggregate for a predetermined period that may have been harvested from various user equipment of a target subscribed user.

At block 408, the behavior interpreter module 326 of the adaptive security engine 320 analyzes the behavioral data for a pattern of behavior that may indicate various online security habits of the target subscribed user.

At block 410, the analysis module 328 of the adaptive security engine 320 identifies a susceptibility profile of the subscribed user based on the pattern of behavior from the behavioral data.

At block 412, the analysis module 328 receives environment parameters 118 from the environment parameter database 112. In one embodiment, the environment parameters 118 are received from the environment parameter database 112 upon determining that the susceptibility profile is above a predetermined threshold.

At block 414, the infrastructure policy interface 330 of the adaptive security engine 320 creates a security threat model for the target subscribed user based on the susceptibility profile and the environment parameters.

At block 416 the adaptive security engine 320 determines whether the security threat model for the target subscribed user is above a predetermined security threshold. If not, (i.e., "NO" at decision block 416), the process returns to block 406 after a predetermined wait period (i.e., block 430). In one embodiment (e.g., where the first period is the same as the first period), the process returns to block 402.

Returning to block 416, upon determining that the security threat model for the target subscribed user is at or below the predetermined security threshold, (i.e., "YES" at decision block 416), the process continues with block 418, where device data 116 is received from the device information database 110. The device data 116 may indicate the type of various user equipment that are under an account of the target subscribed user.

At block 420, a security solution is created by the infrastructure policy interface module 330 of the adaptive security engine 320. In one embodiment, this security solution is based on the security threat model for the target subscribed user and the device data related to the one or more user equipment identified in the account of the target subscribed user. In other embodiments, the threat model (and in one embodiment the device data) is sent to the policy database 120 to retrieve therefrom a policy 122 for the particular threat model (and possibly the device data). The security solution may then be based on the policy dictated by the policy database 120.

In various embodiments, the security solution may be as simple as a warning that may be displayed and/or played on a user interface of a recipient user equipment (e.g., in the form of a message on a display of the user equipment, an audio voice message, alert, and the like). In other embodiments, the security solution may comprise instructions to activate and/or adjust one or more security tools 220 on the corresponding user equipment. In some scenarios, the security solution may be sent to a group that the user belongs to, such that the group as a whole may benefit from the new security solution. If different types of user equipment are identified to correspond to an account of the target subscribed user, then the security solution may have a different solution for each type of user equipment. The security solution may be in the form of a report data packet that is sent over the network 140

In one embodiment, the security solution may comprise sending a warning to a system administrator of the business enterprise that the target subscribed user belongs to. Alternatively, or in addition, the security solution may automatically adjust security parameters of the business enterprise related to the target subscribed user. For example, if the threat model of a target subscribed user is above a predetermined threshold, then any access requested by the target subscribed user may include additional precautionary measures, such as biometric authentication.

At block 422, a notification in the form of a report data packet is sent to an appropriate recipient. In various embodiments, the report data packet may be sent to an account of the target subscribed user, to a system administrator of the business enterprise that the user belongs to (e.g., information technology (IT) department), or directly to computing equipment that is configured to make adjustments to the security parameters of a business enterprise network as it relates to the target subscribed user. In one embodiment, the report data packet is treated as an auditing report that can be used by the system administrator to adjust the present policy for a particular threat model (and possibly device data).

In some embodiments, the report data packet includes a security solution for a particular user equipment, which is operative to activate and/or adjust one or more security tools on the respective user equipment. In one embodiment, if different types of user equipment are identified to correspond to an account of the user, then the report data packet may have a different solution for each type of user equipment associated with an account of the target subscribed user.

In some embodiments, the security solution is not based on the device data. In this regard, block 418 may be skipped. Accordingly, the report data packet may be based on the identified threat model for the target subscribed user (i.e., without taking into consideration the device data 116). Thus, in such a scenario, a security solution that is tailored for each type of user equipment associated with a target subscribed user may not be provided.

Upon completion of block 422, the process continues with block 402 or block 406 after a predetermined wait period 430, as discussed above.

CONCLUSION

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications, and variations that fall within the true scope of the present teachings.

It is understood that the harvesting of the behavioral data is performed upon approval from the subscribed user. It is understood that any specific order or hierarchy of steps in the process disclosed in FIG. 4 are illustrations of exemplary approaches. Based upon design preferences, it is understood that the specific order or hierarchy of steps in the processes may be rearranged, expanded, and some steps omitted. Some of the blocks may be performed simultaneously.

Unless otherwise stated, any measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A computing device comprising:
   a processor;
   a network interface coupled to the processor;
   a storage device coupled to the processor; and
   a security application stored in the storage device, wherein execution of the security application by the processor configures the computing device to perform acts comprising:
      receiving behavioral data of a user, for a predetermined period;
      analyzing the behavioral data for a pattern of online behavior of the user with one or more user equipment identified to be used by the user;
      creating a susceptibility profile of the user based on the pattern of online behavior of the user with the one or more user equipment;
      receiving one or more environment parameters;
      creating an adaptive security threat model tailored for the user based on the susceptibility profile of the user and the one or more environment parameters;
      iteratively, until the adaptive security threat model exceeds a first predetermined threshold:
         monitoring the behavioral data;

adjusting the susceptibility profile of the user based on the monitoring of the behavioral data; and adjusting the adaptive security threat model in accordance with the monitoring of the behavioral data;

in response to the adaptive security threat model exceeding the first predetermined threshold, creating an adaptive security solution tailored for the user equipment based on the adaptive security threat model; and sending a report data packet that includes the adaptive security solution via the network interface to an account of the user.

2. The computing device of claim 1, wherein:

the user is identified to use a plurality of user equipment; and each user equipment is of a different type.

3. The computing device of claim 1, wherein execution of the security application by the processor further configures the computing device to perform acts comprising, sending the report data packet to a system administrator of a business enterprise to which the user belongs.

4. The computing device of claim 1, wherein the report data packet is operative to adjust one or more access controls to the network for the user, based on the security threat model.

5. The computing device of claim 1, wherein the environment parameters are received upon determining that the susceptibility profile of the user is above a second predetermined threshold.

6. The computing device of claim 1, wherein execution of the security application by the processor further configures the computing device to perform acts comprising:

receiving device data comprising information as to each type of user equipment identified to be used by the user, wherein the report data packet comprises an adaptive security solution that is tailored for each type of user equipment based on the adaptive security threat model and the device data.

7. The computing device of claim 1, wherein the behavioral data includes one or more ambient conditions under which the user is operating the one or more user equipment.

8. The computing device of claim 1, wherein the behavioral data includes, for a predetermined period, a type and volume of information shared on a social networking site.

9. The computing device of claim 6, wherein:

the report data packet is sent to a server of a business enterprise to which the user belongs; and the device data is operative to automatically adjust security parameters of the business enterprise from the server.

10. The computing device of claim 1, wherein execution of the security application by the processor further configures the computing device to perform acts comprising:

upon determining that a threshold number of users in a same group as the user (i) have a same adaptive security threat model and (ii) the adaptive security threat model is above the first predetermined threshold, sending the report data packet to accounts of all users in the same group.

11. The computing device of claim 1, wherein execution of the security application by the processor further configures the computing device to perform acts comprising:

upon determining that the adaptive security threat model is above the predetermined threshold, sending the report data packet to accounts of all users in a same group as the user.

12. The computing device of claim 1, wherein the acts comprise:

requesting the environment parameters from a database;

wherein the one or more environment parameters are received in response to the request.

13. A non-transitory computer-readable medium having stored thereon a plurality of sequences of instructions which, when executed by the processor, cause the processor to perform a method of providing security, the method comprising:

receiving behavioral data of a user, for a predetermined period;

analyzing the behavioral data for a pattern of online behavior of the user with one or more user equipment identified to be used by the user;

creating a susceptibility profile of the user based on the pattern of online behavior of the user with the one or more user equipment;

creating an adaptive security threat model tailored for the user based on the susceptibility profile of the user;

iteratively, until the adaptive security threat model exceeds a first predetermined threshold:

monitoring the behavioral data;

adjusting the susceptibility profile of the user based on the monitoring of the behavioral data; and adjusting the adaptive security threat model in accordance with the monitoring of the behavioral data:

in response to the adaptive security threat model exceeding the first predetermined threshold, creating an adaptive security solution tailored for the user equipment based on the adaptive security threat model;

sending the adaptive security threat model to a policy database;

receiving a policy from the policy database based on the adaptive security threat model; and sending a report data packet that includes the adaptive security solution based on the policy to an account of the user.

14. The non-transitory computer-readable medium of claim 13, wherein the method comprises:

receiving environment parameters from a database;

wherein the adaptive security threat model is further based on the environment parameters.

15. The non-transitory computer-readable medium of claim 14, further comprising, in addition to sending the adaptive security threat model to the policy database, sending the environment parameters together with the adaptive security threat model to the policy database, wherein the adaptive security threat model is based on the susceptibility profile and the environment parameters.

16. The non-transitory computer-readable medium of claim 13, wherein the report data packet is operative to adjust one or more access controls to the network for the user.

17. The non-transitory computer-readable medium of claim 13, wherein:

the behavioral data is sensed by one or more user behavior sensors of the one or more user equipment.

18. The non-transitory computer-readable medium of claim 17, wherein:

the user is identified to use a plurality of user equipment; and each user equipment is of a different type.

19. The non-transitory computer-readable medium of claim 13, further comprising, sending the report data packet to a system administrator of a business enterprise to which the user belongs.

20. The non-transitory computer-readable medium of claim 19, wherein the report data packet is operative to adjust one or more access controls to a network for the user, based on the policy.

\* \* \* \* \*